United States Patent [19]

Hancu

[11] 4,102,003
[45] Jul. 25, 1978

[54] WIPER BLADE STRUCTURE FOR VEHICLES

[75] Inventor: Théodore Hancu, Geneva, Switzerland

[73] Assignee: Societe d'Exploitation de Brevets J.B., Fribourg, Switzerland

[21] Appl. No.: 755,692

[22] Filed: Dec. 30, 1976

[30] Foreign Application Priority Data

Jan. 7, 1976 [CH] Switzerland .................. 90/76

[51] Int. Cl.² .................................... B60S 1/02
[52] U.S. Cl. ................................... 15/250.42
[58] Field of Search ............... 15/250.42, 250.36

[56] References Cited

U.S. PATENT DOCUMENTS

| | | | |
|---|---|---|---|
| 2,996,746 | 8/1961 | Vickerson | 15/250.42 |
| 3,218,664 | 11/1965 | Wise | 15/250.42 |
| 3,978,543 | 9/1976 | Tomlin | 15/250.42 |
| 4,007,511 | 2/1977 | Deibel | 15/250.42 |

*Primary Examiner*—Robert W. Jenkins
*Attorney, Agent, or Firm*—Nolte and Nolte, Jr.

[57] ABSTRACT

Wiper blade structure comprising a blade strip mounted at the ends of support arms. There is provided a center bridge forming at least two support arms for the middle region of the blade, and an outer bridge forming two support arms for the ends of the blade located on each side of the arms of the center bridge. The arms of said outer bridge are elastically deformable.

1 Claim, 2 Drawing Figures

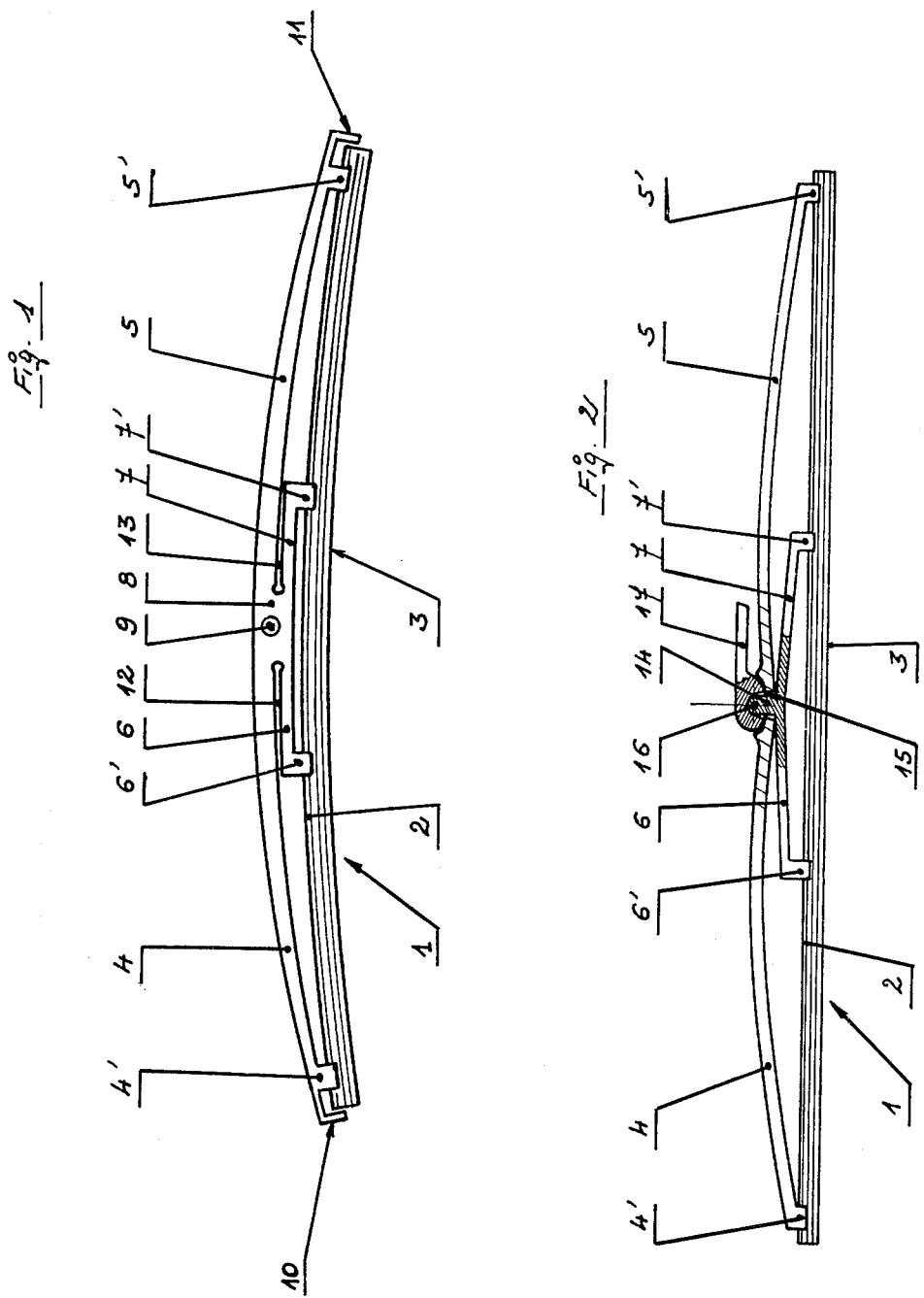

WIPER BLADE STRUCTURE FOR VEHICLES

The present invention relates to wiper blade structures for vehicles, such as those employed for wiping windscreens, rear windows or head-lamps of automobile vehicles, boats, etc.

These wiper blade structures are removably mounted on the end of pivotal arms and are replaced when the blade that they include is worn. They must be light and cheap. However, they must be strong and have a long working life. Moreover, they must follow the shape of the surfaces to be wiped which requires high deformability.

Known wiper blade structures usually comprise a support on which the bearing pressure transmitted by the arm is applied, the blade being connected to the support by arms which are articulated to the support or to intermediate members. It will be understood that this construction is complicated and costly. The recent use of plastics materials has permitted a substantial reduction in the weight with respect to metal wiper blade structures but has neither greatly simplified the assembly nor substantially lowered the cost.

An object of the present invention is to considerably simplify the manufacture and assembly of wiper blade structures and to reduce their cost while conserving or increasing the required mechanical qualities.

Thus, according to the invention, there is provided a wiper blade structure comprising a blade mounted at the ends of support arms, wherein there is provided a centre bridge forming at least two support arms for the middle region of the blade, and an outer bridge forming two support arms for the ends of the blade located on each side of the arms of the centre bridge, the arms of said outer bridge being elastically deformable.

Such a wiper blade structure has been shown in the accompanying drawings by way of a non-limitative embodiment. In the drawings:

FIG. 1 is an elevational view of a wiper blade structure according to a first embodiment of the invention, and FIG. 2 is an elevational view, partly in section, of a modification of a wiper blade structure according to the invention.

In the embodiment shown in FIG. 1, the wiper blade structure comprises a blade 1 of conventional shape having a bead 2 and a wiping profile 3. Two outer arms 4 and 5, forming a first bridge, and two centre arms 6 and 7, forming another bridge, are in one piece composed of plastics material and comprise at their ends a gripping clip respectively 4', 5', 6' and 7' which surround the bead for maintaining the blade 1 in position.

The arms 4, 5, 6 and 7 extend laterally from a portion 8 provided with means for mounting the blade structure on a wiper arms. In the illustrated embodiment, these mounting means consist of a transverse bore 9 which receives a pin of a support (not shown). These mounting means may consist of two pins extending transversely outside the portion 8. By way of a modification, the portion 8 may have a cavity, each of the lateral walls of which carries an inwardly extending pin. The latter two modifications are adapted to receive a support provided with bores for receiving the pins. Advantageously, the ends of the arms 4 and 5 have abutments 10 and 11 which are moulded with the arms or hot bent and serve to limit the longitudinal movements of the blade 1.

The arms 4 and 6 are elastically deformable owing to the properties of the plastics material, for example polycarbonate, of which they are composed. This deformability may also be regulated by the shape of these arms and also by the gap constituted by the slots 12 and 13 which space them from the arms 6 and 7 respectively. The arms 6 and 7 may be relatively rigid. The assembly constituted by the arms 4, 5, 6 and 7, with their hooks 4', 5', 6' and 7', and the centre portion 8, may be constructed by injection moulding which considerably reduces the cost. The blade 1 may be very easily mounted in taking advantage of the deformability of the arms 4 and 5 and its own flexibility.

With reference now to FIG. 2 in which the same reference characters designate the same parts as in FIG. 1, the centre bridge, constituted by the arms 6 and 7, and the outer bridge constituted by the arms 4 and 5, are distinct from each other. The centre bridge comprises a projection 14 in opposed relation to the gripping cips 6' and 7' and extending through an opening 15 in the outer bridge. The projection 14 has a transverse bore 16 for the passage of the pivot pin of a support 17. After assembly, the support 17 interconnects the two bridges, which may be constructed from the same material or different materials.

What is claimed is:

1. A windshield wiper comprising a wiper arm, a wiper blade structure pivoted to said wiper arm, said blade structure comprising a squeegee, a center bridge having two support arms connected to said squeegee at central regions thereof on opposite sides of the connection of the structure to the wiper arm, an outer bridge having two support arms connected to said squeegee at opposite ends thereof, said outer bridge comprising a unitary structure and being resiliently flexible along substantially its entire length, said center bridge having a projection and said outer bridge having an opening through which said projection extends, a portion of said projection on that side of the outer bridge opposite to the side upon which the center bridge is disposed, having a pivot hole, a pivot pin secured to said wiper arm and projecting into said pivot hole whereby adjacent portions of said wiper arm and center bridge constitute means holding said bridges together.

* * * * *